Aug. 23, 1927.

N. H. PREBLE 1,639,751

CONVEYING APPARATUS

Filed Oct. 8, 1923

Inventor
Norman H. Preble

Attorneys

Patented Aug. 23, 1927.

1,639,751

UNITED STATES PATENT OFFICE.

NORMAN H. PREBLE, OF DETROIT, MICHIGAN, ASSIGNOR TO THE CECIL R. LAMBERT COMPANY, INC., OF DETROIT, MICHIGAN, A CORPORATION OF MICHIGAN.

CONVEYING APPARATUS.

Application filed October 8, 1923. Serial No. 667,386.

The invention relates to conveying apparatus and refers more particularly to that type having a sprocket chain provided with dogs which are engageable with trucks straddling the chain. One of the objects of the invention is the provision of a support for the sprocket chain which can be manufactured and assembled at a great saving over the supports heretofore used and which can be shipped more economically. With these as well as other objects in view, the invention resides in the novel features of construction and combinations and arrangements of parts as more fully hereinafter set forth.

Figures 1, 2, 3:
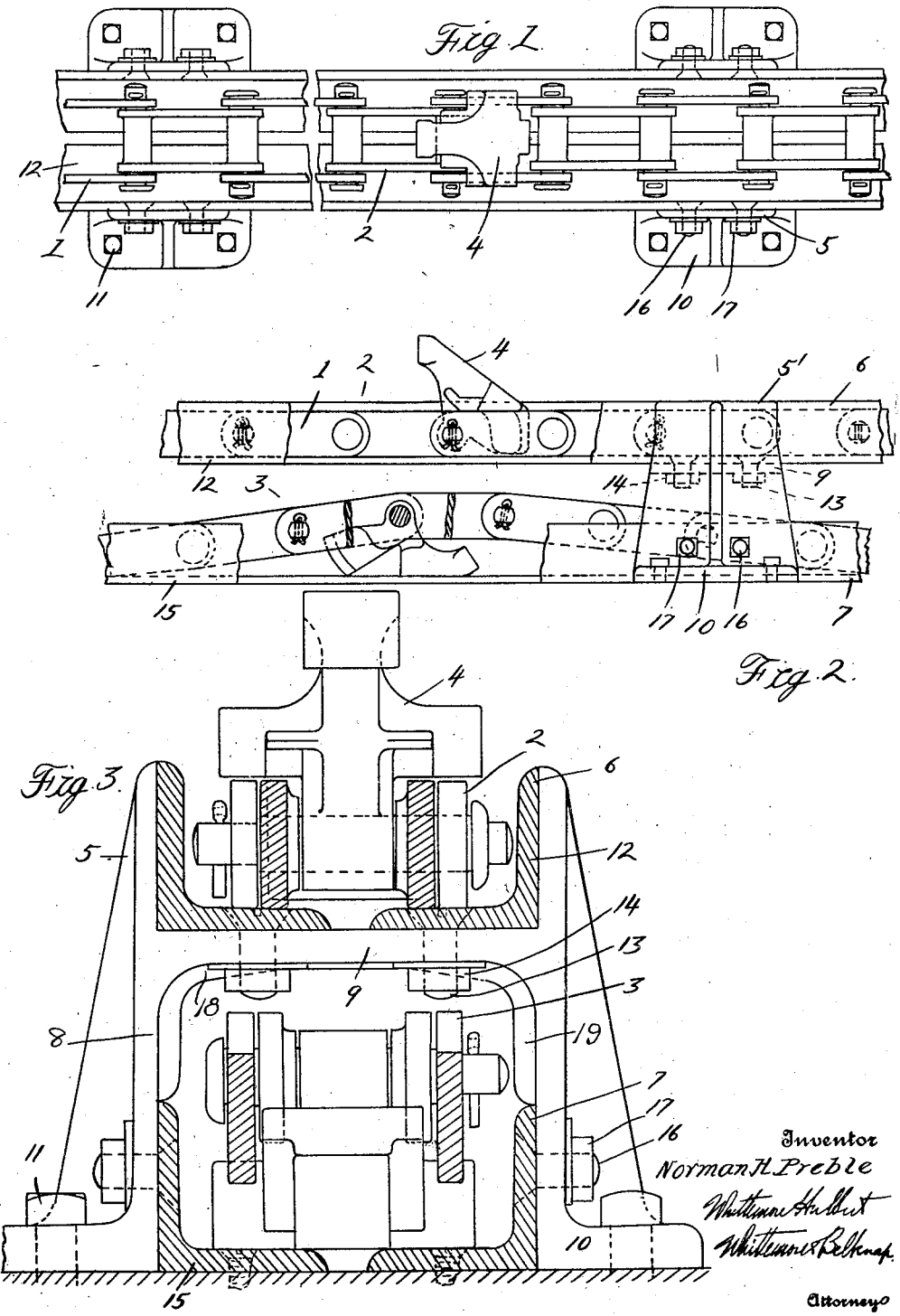
Figure 1 is a plan view of a conveying apparatus embodying my invention.
Figure 2 is a side elevation thereof partly broken away.
Figure 3 is a transverse section therethrough.

1 is a sprocket chain having the upper and lower portions 2 and 3 respectively. This chain is formed of pairs of links pivotally connected to each other and provided with the dogs 4 journalled upon the link pivots, the arrangement being such that the dogs upon the upper portion of the chain have noses extending thereabove to engage the work trucks which straddle the chain and travel upon tracks on opposite sides of the chain in any usual manner.

The support for the sprocket chain comprises the H-shaped standards 5 and the upper and lower tracks 6 and 7. Each standard has the spaced upright portions 8 and the integrally laterally extending portion 9 connecting the upright portions intermediate the ends. The upright portions have the foot flanges 10 through which extend suitable securing means such as the bolts 11 for securing the standards to the floor. The upper track 6 is made of a pair of angle-shaped members or bars 12 which have upwardly extending flanges contacting with the inner faces of the upright portions 8 of the standards above the lateral portion 9. These angle-shaped members also have laterally extending flanges resting upon the upper faces of the laterally extending portions 9 of the standards. For securing the angle-shaped members 12 to the standards there are the screw bolts 13 extending through the lateral flanges of the angle-shaped members and through the laterally extending portion 9, the heads of these bolts engaging in counter-sunk apertures in the lateral flanges and the lower ends of the bolts being threadedly engaged by the nuts 14. By securing the angle-shaped members 12 of the upper track in this manner, their lateral flanges are held in contact with the laterally extending portions of the standards throughout the widths of the lateral flanges, and furthermore, are held in alignment with each other so that the links of the sprocket chain will properly bear upon the upper faces of the lateral flanges.

The lower track 7 comprises the pair of angle-shaped members or bars 15 having upwardly extending flanges engaging the inner sides of the upright portions 8 of the standards and laterally extending flanges in alignment with each other. These angle-shaped members are secured in place by means of the screw bolts 16 extending through the upwardly extending flanges and the upright portions of the standards, their heads occupying countersunk apertures in the upwardly extending flanges and their outer ends being threadedly engaged by the nuts 17. The angle-shaped members or bars 15 may also be secured directly to the floor by screws extending through their horizontal flanges, in which case the screw bolts for securing the angle-shaped members or bars to the standards may be omitted, if desired. The standard is further provided with integral web portions 18 having downwardly extending projections 19 adapted to engage the vertical flange member 7 for relatively positioning the lower tracks upon the standard. The laterally extending flanges, as shown, are engaged by the dogs 4 which slide therealong.

By forming the supporting and guiding means for the sprocket chain of H-shaped standards and angle-shaped track members, the construction is greatly simplified over one in which channel-shaped track members are supported upon built-up standards. Furthermore, the tracks may be manufactured and assembled more cheaply, and also may be more compactly nested when being shipped. Still another decided advantage is the saving in weight.

What I claim as my invention is:

1. In a conveying apparatus, the combination with a sprocket chain, having upper and lower portions, of a standard having upright portions and an integral lateral portion connecting said upright portions intermediate their ends, a track for the upper portion of said chain supported by the lateral portion, a second track for the lower portion of said chain in engagement with the supporting surface for the standard, and means for positioning the second track including a web integral with said standard and having a downwardly extending projection engageable with said last mentioned track.

2. In a conveying apparatus, the combination with a flexible member, of tracks for said member, means for supporting said tracks including a standard having upright portions, and a projection integral with said standard for positioning one of said tracks.

3. In a conveying apparatus, the combination with a sprocket chain, of an H-shaped standard having upright portions and an integral lateral portion connecting said upright portions intermediate their ends, said upright portions provided with integral foot flanges extending outwardly therefrom for securing said standard to a support, a track for the lower portion of said chain having a portion thereof in substantial alignment with said foot flanges, and means for positioning said track upon the standard.

In testimony whereof I affix my signature.

NORMAN H. PREBLE.